JAMES SNOWDIN, OF WESTFORD, AND JOHN KENT, OF BEAVER DAM, WISCONSIN.

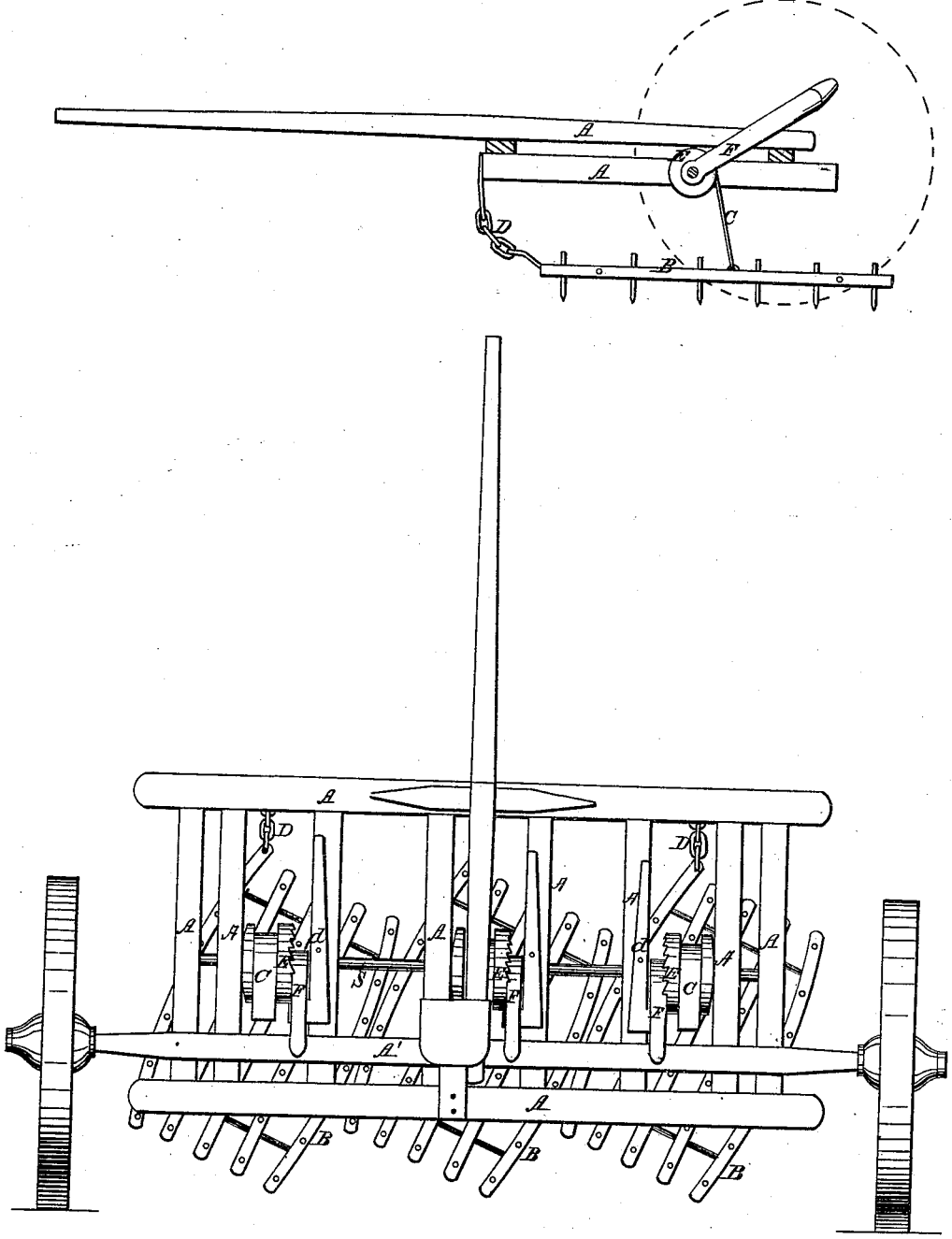

Letters Patent No. 88,225, dated March 23, 1869.

IMPROVEMENT IN HARROWS.

The Schedule referred to in these Letters Patent and making part of the same.

*To all whom it may concern:*

Be it known that we, JAMES SNOWDIN, of the town of Westford, and JOHN KENT, of the city of Beaver Dam, in the county of Dodge, and State of Wisconsin, have invented a new and improved Mode of Using Harrows; and we do hereby declare that the following is a full and exact description thereof, reference being had to the accompanying drawings, in which—

Figure 1 is a plan view, and

Figure 2 is a vertical section, as indicated by red line $x\,y$ of fig. 1.

Like letters in the two figures indicate like parts.

Our invention relates to the devices for suspending and operating harrows under a wagon, or other vehicle, and consists in the arrangement of chains attached to the front and bands attached to the middle of the harrows, the upper ends of the bands being attached to drums arranged separately upon a shaft, the drums being provided with ratchet-wheels, and caused to rotate separately on the shaft, by levers, and held in position by ratchet-springs, in such a manner as that each harrow may be operated separately.

We construct the frame A with axle A' for attaching the wheels of a wagon, or other vehicle, the cross-bars of the frame being arranged with the view of properly supporting and arranging the other devices, as shown in fig. 1.

E represents drums arranged to rotate separately upon the shaft S, and

E' are ratchet-wheels, or rims, attached to one end of the drums.

F represents levers attached to shaft S, and so as to oscillate thereon, and are provided with metallic plates on the front side, so as to catch in the ratchet-wheels, when moved forward, and thus to rotate the drums.

$d$ represents ratchet-springs arranged so as to hold in position the drums, by catching in the ratchet-wheels.

D represents chains attached to the front of the harrows B and frames A, and

C represents bands attached to the middle of the harrows, and to the drums E, as shown in fig. 2.

Operation.

Levers F, which oscillate separately upon the shaft S, being placed against and thus caused to catch in the ratchet-wheels E', and moved forward, turn the drums E, which, by means of the bands C, attached thereto, raise the harrows to any required height to allow them to pass over rocks, or other obstructions, and to regulate their pressure upon and depth in the ground.

The drums being arranged upon the shaft, so as to be operated separately, as described, each harrow can be regulated separately, when required to pass over obstructions.

Having thus fully described our invention,

What we claim therein as new, and desire to secure by Letters Patent, is—

The bands C, chains D, drums E, ratchet-wheels E', ratchet-springs $d$, and levers F, in combination with the frames A and harrows B, as arranged, substantially in the manner and for the purpose as described.

JAMES SNOWDIN.
JOHN KENT.

Witnesses:
THOMAS MATHER,
DUANE D. LOOMIS.